July 20, 1965 D. H. BROOKS 3,196,033
PROCESS FOR COATING AN ARTICLE IN AN
AERATED BED OF PARTICLES
Original Filed Oct. 14, 1959

INVENTOR.
DONALD HERBERT BROOKS
BY
ATTORNEYS

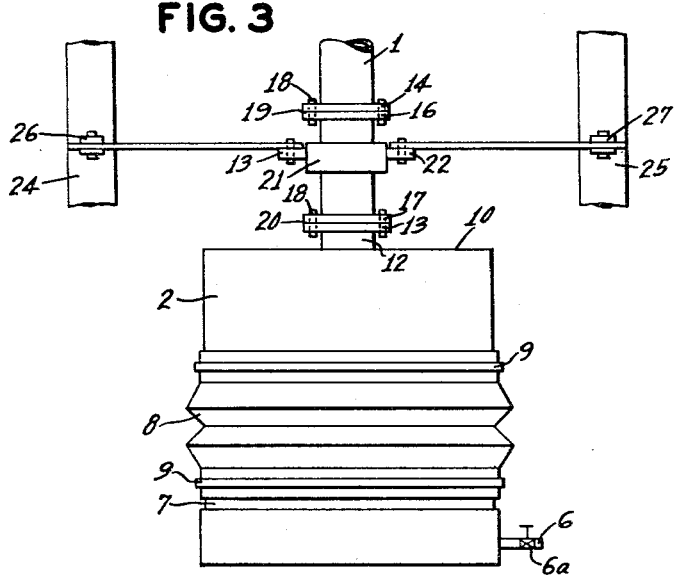
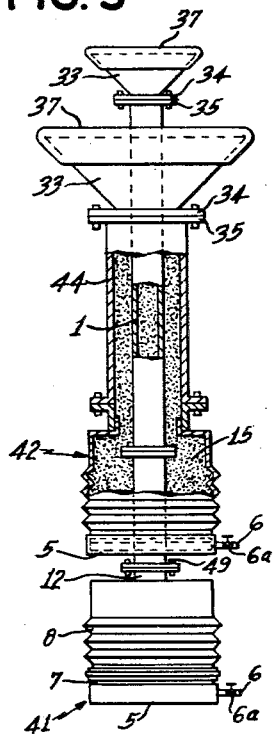
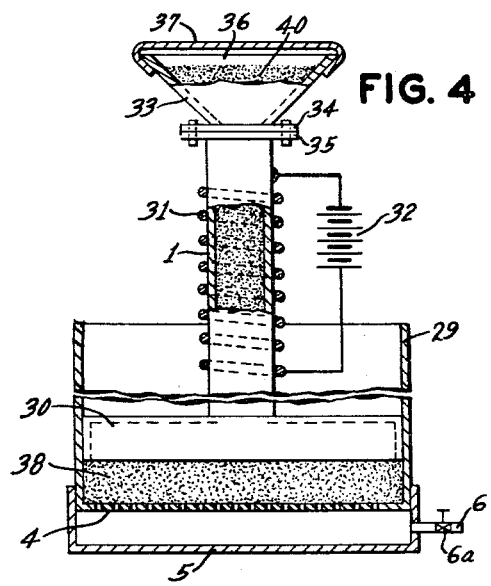

*INVENTOR.*
DONALD HERBERT BROOKS
BY
ATTORNEYS

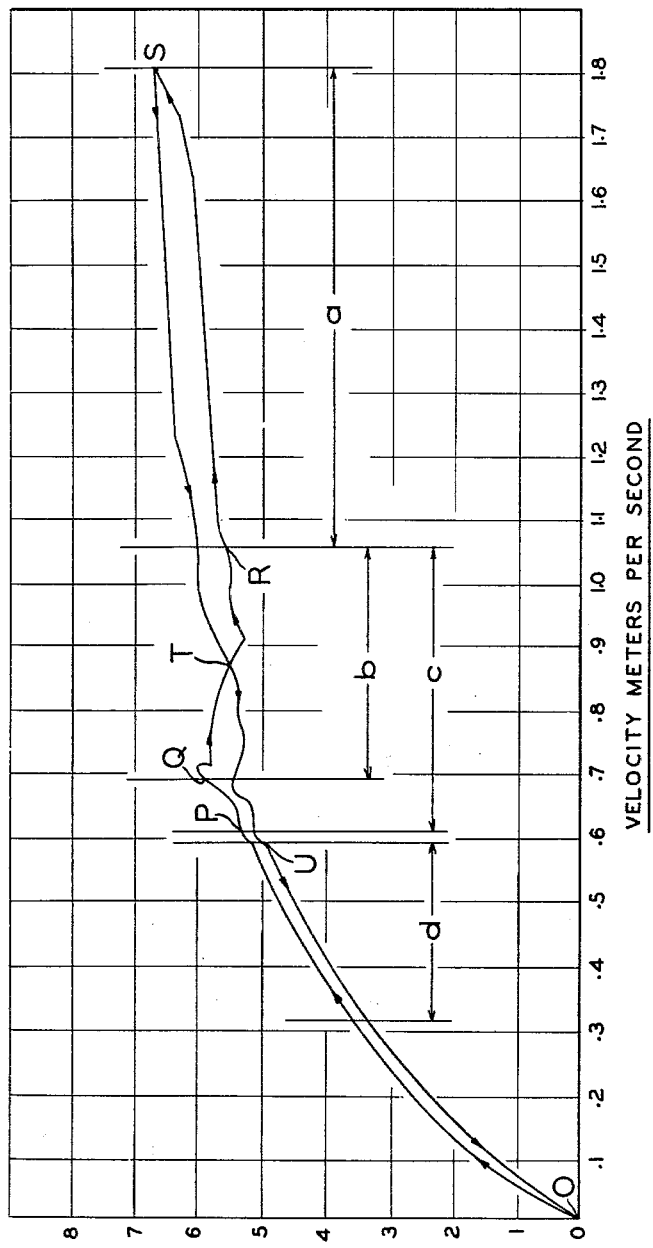

United States Patent Office 3,196,033
Patented July 20, 1965

3,196,033
PROCESS FOR COATING AN ARTICLE IN AN AERATED BED OF PARTICLES
Donald Herbert Brooks, Denver, Johannesburg, Transvaal, Republic of South Africa, assignor, by mesne assignments, to International Protected Metals, Inc., a corporation of New Jersey
Continuation of application Ser. No. 846,376, Oct. 14, 1959. This application Mar. 10, 1964, Ser. No. 350,911
10 Claims. (Cl. 117—21)

The present application is a continuation-in-part of my co-pending patent application Serial No. 806,931, filed April 16, 1959, and is a continuation of my co-pending application Serial No. 846,376, filed October 14, 1959, now abandoned.

The present invention relates to a method and means for applying coatings, more particularly coatings of thermoplastic materials to articles of various shapes and sizes.

In the art of applying plastic coatings to articles, several different coating methods are known including the method of spraying liquid plastic material onto the articles, the method of spraying pulverized or powdered plastic material onto a heated object, the method of passing a circulatory stream of plastic particles into contact with a heated article, and the method of contacting the article to be coated, while in a heated state, by immersing the article in a fluidized bed of plastic particles.

An example of the method of passing a circulatory stream of plastic particles into contact with a heated article is disclosed in U.S. Patent No. 2,719,093.

In this particular instance a thermoplastic powder is blown in a finely dispersed form through a hollow body such as a pipe to be coated. The pipe to be coated is connected into the system in the cold state and then heated sectionally by a ring burner geared to travel extremely slowly up the outside of the pipe while an air stream with entrained thermoplastic powder passes through. It appears to be quite impossible to obtain thin and even coatings by this method.

An example of the method of contacting a heated article by immersing it in a fluidized bed of plastic particles is disclosed in United States Patent No. 2,844,489. In accordance with this process, the article to be coated is immersed in a fluidized bed and kept in continuous motion in order to produce an even coating.

A third method is disclosed in German Patent No. 1,051,175 which describes a method of coating a pipe internally with a plastic. In accordance with that method, a fluidized bed is set up in a vessel to the top of which the heated pipe or the like to be coated is connected. The gas pressure is then increased, as a result of which the fluidized bed is expanded into the pipe. A turbulent condition results. In my experience it is extremely difficult, if not impossible, to obtain an even, non-porous coating by this method.

It is an object of the present invention to provide a new or improved method by which very even, and if desired, very thin coatings of thermoplastic material can be applied to pipes and more generally to objects of various shapes and sizes, hollow or otherwise.

It is a further object of the invention to achieve this end in a very economical manner and in a minimum of time.

Further objects, advantages and applications of the invention will become apparent from the following.

In accordance with the invention, the coating process comprises contacting the surface to be coated with a bed of particulate material, e.g., powder, in an adequately mobile state of even aeration for substantially uniform contacting of the surfaces to be coated with the particulate material intermediate between that of the truly fluidized material and that of the loosely settled material during at least a substantial part of the coating period, preferably at least the initial part of the coating period, while maintaining conditions suitable to cause the adherence of the particles to the surface to be coated, either by rendering the said surface itself adhesive prior to the above-mentioned contacting step or by heating the surface to be coated to a temperature at which the particles become at least plastiform enough to adhere to the surface.

Thus, the process may be carried out by contacting the surface to be coated with a collapsing fluidized bed of particulate material, or more particularly by contacting the surface to be coated, while in a heated state, with a collapsing fluidized bed of thermoplastic particles.

For this purpose a fluidized bed is normally first set up with a bulk density corresponding to optimum fluid conditions or a lower bulk density not below the limit under which a substantial proportion of the material becomes entrained in the gas stream, whereafter the fluidized bed is caused to collapse with the surface to be coated in contact therewith.

The collapsing of the bed may be brought about in several manners. It may be achieved by increasing the gravitational head on the fluidized bed without simultaneously increasing the pressure of the fluidizing medium entering the bottom of the fluidizing vessel.

Generally speaking, the desired effects may also be brought about in other manners which produce a change in the ratio between the density of the fluidizing medium and that of the particles, for example, by increasing the pressure above the fluidized bed without applying more gas pressure from underneath. It can also be done by reducing the feed pressure of the fluidizing medium. A similar effect can be obtained by altering the temperature of the fluidizing medium or by changing the chemical composition of the fluidizing medium.

A further method by means of which a fluidized bed may be caused to collapse for the purposes of this invention comprises applying vibration to the fluidized bed so as to cause movement of the particles in a direction normal to the direction of flow of the fluidizing medium.

Various modifications of the above-mentioned methods to cause collapsing of the fluidized bed may be employed in combination.

Some of the above-mentioned methods also have secondary beneficial effects. Thus the application of vibrations will help to prevent the separation of particles in the fluidized bed differing in specific gravity and/or diameter. It is important that this type of separation is avoided or prevented as far as possible. Raising and lowering of the bed surface will also assist to this end. If desired or required, the bed may be tipped from time to time or mechanically agitated. It is also possible to continually or intermittently circulate material from the lower part of the fluidized bed to the upper part.

The above-mentioned method which comprises increasing the gravitational head on the bed so as to cause collapsing of the fluidized bed is particularly applicable to the coating of the inside of tubular bodies.

Generally speaking, this form of the process may be defined as comprising keeping the heated surface to be coated in a confined space above the normal level of a fluidized bed under optimum or more than optimum fluidized conditions, decreasing the volume of the space occupied by the normally fluidized bed in such a manner that the aerated material is displaced into contact with the hot surface and that the gravitational head on the bottom of the fluidizing vessel is increased to such an extent that collapsing of the bed is initiated, subsequently increasing again the volume of the lower fluidizing space so as to allow the particulate material to fall back into the fluidizing space proper and preferably to return to its normal fluidized condition. In the preferred process, the said expansion of the fluidization space proper, so as to cause the return of the particulate material into this space, takes place after the particulate material has lost most of its fluidity and can be described as a mass of powder more or less evenly settling but not compacted. Increasing the volume of the bed container proper not only causes a mere gravitational return of the particulate material to the fluidizing space but simultaneously sets up suction which assists this return movement. Excess unfused powder retained on horizontal or weakly inclined surfaces of the article being coated may be removed by a controlled additional air current and/or mechanical means.

The above-mentioned confined space may be the inside of a hot pipe section or the like which is to be coated internally. Bodies of almost any size or shape can, however, be coated in this manner, for example, the hot pipe section may be replaced by a cold pipe section or other hollow casing inside which the bodies to be coated are suspended.

In the above-described manner, a perfectly even and thin coating is obtainable. Should a thicker coating be desired, the heated article is brought into contact with a collapsing bed in the manner described several times in succession before the article is finally removed and allowed to cool.

When building up a thicker coating in this manner, it is also possible to apply successive coatings of different compositions. For this purpose the vessel in which coating takes place may be successively connected to different fluidizing vessels containing different particulate materials. It is, for example, very often desirable to apply a first coating of a thermoplastic material which is of a type giving a very strong bond with the article being coated, followed by another thermoplastic material which is more suitable for building thick coatings. Alternatively a first layer of thermoplastic material may be deposited on the article and while this layer is still tacky, a further layer of a particulate material which does not become plastic or liquid at the temperature employed, may be applied in the manner indicated, e.g., a layer of glass flakes, beads or fiber or the like, acting as a reinforcing and/or protective layer.

In the above-mentioned form of the process for coating pipes and the like, it was found advantageous if the powder bed slowly "wipes" past the surface being coated. A wiping movement already results from the collapsing of the powder bed. However, for very thick coatings the contacting may be continued after the powder bed has stopped contracting any further, the powder then being "metered" back into the fluidizing space.

This metering may be carried out by means of a star wheel, screw-conveyor, revolving door-type mechanism or the like. Alternatively the whole pipe or the like including a funnel-like container mounted above the pipe are filled with aerated material during the compression step, whereafter the volume of the fluidizing vessel is slowly increased during the coating stage and then rapidly expanded at the end of the coating stage to return all powder to the fluidizing chamber.

The process in accordance with the invention is also applicable to the well known dipping procedure. Again, a fluidized bed is set up in a suitable fluidizing vessel, and the article to be coated is heated and immersed in the particulate material of the said fluidized bed while the fluidized bed is caused to collapse. Preferably but not necessarily, the article is dipped into the particulate material after the collapsing has already been initiated. Collapsing of the bed may again be brought about by reducing the cross-sectional area of the bed and thereby increasing the pressure head on the bottom of the bed. A similar effect can be obtained by increasing the pressure in the gas space above the fluidized bed without increasing the pressure of the fluidizing medium which is applied to the bed from underneath. Alternatively, the supply of fluidizing medium from underneath the bed is reduced or stopped altogether.

Prior to causing the collapse of the bed, steps are preferably taken to ensure that the bed is as evenly fluidized as possible, e.g., by slowly agitating or swirling the bed.

In the preferred process, steps are taken to prevent or inhibit the escape of aerating medium through the bottom of the fluidizing vessel. As a result, the collapsing of the bed takes place more gradually since the fluidizing medium can only escape by slowly working its way upwards through the particulate material.

Whereas it is the usual practice to employ air as the fluidizing medium, advantages are often gained by employing a gas as the fluidizing medium which is inert to the particulate material. Examples of such fluidizing media are nitrogen, carbon dioxide, hydrocarbon gases, some of which have better fluidizing properties than air. It is also possible to control the fluidizing properties of the fluidizing medium to a certain extent by controlling its temperature. Temperature control may also be employed to control the thickness and quality of the coating. Similarly, it is possible to produce variations in thickness and quality of the coating by varying the temperature of the article being coated in a manner similar to that known from the conventional fluidized bed coating technique.

The quality and properties of the particulate material used in the process can have an important influence on the smooth operation of the process and the quality of the coating. The film thickness and quality may, for example, be controlled by controlling the particle size distribution of the thermoplastic particulate material.

My investigations to date have been mainly carried out with powders, the bulk of which have particles sizes between 50 and 400 mesh British Standards. However, it is to be expected that, depending on the specific gravity of the particles, sizes outside these limits are also suitable.

Particle shape also plays an important part. Most of my investigations to date have been carried out with thermoplastic materials of relatively low specific gravity in particular organic thermoplastic resins. From my investigations to date it can be safely said that for powders of thermoplastic material having a specific gravity at least up to 2, the most favorable particle shape is globular.

One type of apparatus in accordance with the invention for carrying out the process comprises at least one fluidizing vessel communicating or adapted to communicate with a coating space which is at least partly higher than the normal level of the fluidized bed in the fluidizing vessel and means for reducing the volume of the fluidizing vessel by an amount which is at least equal to a substantial part of the volume of the coating space.

The means for reducing the volume may, for example, take the form of a piston adapted to enter the fluidizing vessel. Alternatively, the walls of the fluidizing vessel may be deformable, means being provided to bring about the deformation of the walls in such a manner that the volume of the vessel is reduced. For example, all or part of the walls of the fluidizing vessel may be constructed in the form of bellows. In case it is desired to coat only the inside of hollow bodies, such as tubes or pipes, the said hollow bodies may themselves serve as the coating chamber. For example, if the apparatus is designed for the internal coating of pipes, a flange or other suitable connecting means is provided on the perimeter of an opening in the top of the fluidizing vessel. In use, the hot pipe section is mounted on the flange or suitably connected to the equivalent connecting means prior to displacing the particulate material of the fluidized bed into the pipe as specified above. Preferably, the apparatus also comprises means for thermally insulating the hot pipe section from the remainder of the apparatus, e.g., a gasket of a suitable insulating material.

For the internal coating of straight pipe sections, the mounting means are preferably so arranged that the pipe connected thereto stands vertical. For the coating of bent pipe sections, the connecting means are so arranged that horizontal parts of the pipe sections connected thereto are avoided as far as possible. Although it is desirable to avoid a horizontal or near horizontal positioning of the pipes to be coated or parts thereof, it is nevertheless possible to coat such parts if necessary and even to coat parts of pipe sections which are inclined in a downward direction.

In a preferred embodiment of the invention the top part of the fluidizing vessel is integral with a piston which is adapted to be rammed down into the fluidizing vessel. For the purposes of this invention, it is immaterial whether the piston remains stationary and the fluidizing vessel is adapted to be raised upwards or vice versa, or whether both parts of the apparatus are movable, the one being adapted to be lowered while the other is simultaneously raised.

Preferably the apparatus also comprises means for preventing or inhibiting the return of aerating medium through the bottom of the fluidizing vessel while collapsing of the bed is in progress. A valve or system of valves may be employed for this purpose.

An alternative apparatus which is particularly applicable for carrying out the dipping procedure in accordance with the invention comprises a fluidizing and coating vessel, the top of which is closed or adapted to be closed with the exception of an outlet for the fluidizing medium passing through the fluidized bed and means for setting up a back pressure in the gas space above the fluidized bed. The means for applying a back pressure may, for example, take the form of a gas inlet connected to a source of higher pressure than the gas pressure normally prevailing above the level of the fluidized bed. Alternatively, means may be provided for closing or constricting the gas outlet in the top of the container.

Again, it is advantageous if the apparatus is provided with means for preventing or inhibiting the backflow of fluidizing medium when the back pressure is applied.

The above-mentioned coating method in its various forms can be carried out using pressures of the order of atmospheric pressure. During the fluidizing stage of the process, the pressure above the fluidized bed is usually approximately equal to atmospheric pressure. The pressure in the airbox underneath the fluidized bed is usually between 4 inches and 48 inches water gauge or higher, depending on the specific gravity of the plastic powder bed, the height of the bed and the pressure drop across the filter cloth, porous plate or similar support constituting the bottom of the bed. If, for example, the bulk density of the bed is 0.25, then for every foot height of the bed between 3 and 4 inches water gauge, excess pressure is required to maintain a properly fluidized bed, this pressure being added to the pressure drop through the filter or the like. If the bulk density of the bed is higher, a correspondingly higher pressure of the fluidizing medium has to be employed. The process in accordance with the invention may, however, be carried out in a closed system in which an elevated overall pressure is maintained. The various embodiments of apparatus in accordance with the invention as described are also suitable for use under such conditions.

The following advantages can often be gained by operating at elevated overall pressures:

(1) A more even and efficient fluidization can often be attained.

(2) Some thermoplastic substances tend to evaporate or decompose at or near the temperature of the hot article being coated when the operation is carried out at normal pressure. This difficulty can sometimes be avoided by employing a higher pressure.

Operating with what I described above as a "collapsing fluidized bed" is one way of carrying out the process in accordance with the invention. The term "collapsing" normally infers a continually changing state of the bed. I have found that there is an optimum condition or range of conditions for coating purposes which lies between the state of full fluidization of the bed and that of total collapse.

In the following, I shall describe and define this condition in more precise terms and shall also describe alternative ways of arriving at the optimum condition for coating and of maintaining an aerated particulate material in the optimum state for coating over prolonged periods.

Thus, in some of its forms, the process in accordance with the invention may also be defined as comprising contacting the surface to be coated in a bed of aerated particulate material in a state of, or approaching that, of static equilibrium between the collapsing and the re-aerating process, the overall average state being intermediate between that normally referred to as fully and evenly fluidized and that in which the particles are fully settled.

It is generally accepted that the term "fluidized" infers that the behaviour of the medium shows a close analogy to that of a fluid. The main characteristic of a fluid is that of free flow, i.e., there can be no angle of repose. As opposed to this, the aerated material employed in accordance with the present invention exhibits a high degree of mobility when mechanically disturbed and yet has a certain angle of repose which is, however, lower than the angle of repose of the un-aerated powder.

The said state of equilibrium is a static one, that is to say, there is no or very little relative movement between adjoining particles as long as the bed is left undisturbed. There is, of course, a relative movement between the aerating medium and the particles.

It is proposed to refer to a material in a condition as specified in the preceding paragraphs as a "static aerate," and the process accordingly comprises contacting the surface to be coated with a static aerate of a particulate material, e.g., a thermoplastic powder.

An important characteristic of a static aerate is the fact that the aerating medium diffuses freely in all directions. For example, if an object is submerged in a static aerate, the aerating medium will diffuse in sideways so as to maintain the aerated condition of the material above the object (which obviously blocks the straight upwards passage of the aerating medium), provided the cross-sectional area of the object is not too large, i.e., does not occupy more than about 1/3 to 1/4 of the total cross-section of the aerating vessel, the exact limits depending to a certain extent on the characteristics of the particulate material and the rate of flow of the aerating medium.

Within the limits of normal operations, I could not observe that an inclination of the walls of the aerating vessel had any noticeable effects. Normally no bubbling takes place at a boundary surface of a perfect static aerate, nor when an article is immersed in the bed, unless the article floats on the bed.

The process is preferably carried out with very fine powders, the individual particles of which are preferably rounded or at least devoid of random projections.

In accordance with the invention it is possible to produce the said static aerate in various manners. However, before proceeding to a description of these methods, it is necessary to discuss certain phenomena which can be observed with beds in various stages of aeration. If an aerating medium is passed through a powder bed in a fluidizing vessel or the like, the pressure drop through the bed may be plotted against the velocity of the aerating medium. Such plots have been published (P. C. Carman, "The flow of gases through porous media," Buttersworth Scientific Publications, December, 1955; and Joseph Gaynor "Basic Fluidized Bed Coating Process and its Modifications," report published by General Electric Company, Schenectady, New York, May 1959). As the gas flow increases, the pressure drop increases. At the gas velocity which changes the system from a packed to a fluidized state the curve may approach the shape of a shallow sinus wave and will from then on flatten out. The nearly horizontal part of the curve corresponds to the truly fluidized condition, and it is in this state that beds have hitherto been employed for coating processes in which the article to be coated is immersed in the powder. If the gas velocity is subsequently reduced, the return curve follows a different path. At the approximate gas velocity corresponding to the merging of the sinus wave portion of the ascending curve, the return curve begins to drop below the level of the ascending curve until it meets the former at the origin. This latter part of the curve corresponds to the state of a static aerate, and as long as the bed condition is not destroyed the pressure drop through the bed will follow the said return curve reversibly, if the gas flow is increased or decreased. The origin of the curves corresponds to the fully collapsed condition of the bed.

It follows from the above that the static aerate, which I have found gives such improved results in coating operations, can be produced by initially fluidizing the particulate material completely and subsequently reducing the flow velocity to the desired degree. The latter depends on the degree of aeration desired so as to obtain a particular quality of coating.

The degree of mobility of a powder bed can be measured by a sort of penetration test developed by me for the purpose. The test utilizes a probe provided with a baffle at its lower end and loaded or adapted to be loaded up to the desired weight. The baffle preferably has a downwardly pointing V-shaped cross-section. The probe can be used in various ways. For example the depth of the bed may be measured to which the probe will penetrate the bed when released from the top of the bed, loaded with a given weight. Alternatively, the weight may be determined which is required to cause the probe to sink to a given level, e.g., the bottom of the bed. Another characteristic that may be determined when operating with this probe is the velocity of sinking with a given load.

The static aerate may also be obtained direct by applying a slow gas stream to the powder while agitating it carefully in a suitable manner, e.g., mainly in a direction from the bottom of the vessel to the top. Similarly, if the equilibrium in a static aerate is destroyed, e.g., by the repeated immersion of articles to be coated in the bed, the static equilibrium condition may be reobtained by slow agitation.

The process is preferably carried out with a bed support producing an extremely fine gas dispersion, e.g. very tightly woven synthetic filter cloth. Conventional bed supports, however, may also be used. Wire gauze and felt usually give unsatisfactory results.

When applying the present process in its various forms to coating by the dipping method, it is preferred to immerse the article to be coated well below the surface of the bed, say about 6 inches.

The invention and the manner in which it may be put into practice will be further described by way of example with reference to the accompanying drawings without thereby limiting the scope of the invention.

In the drawings:

FIG. 3 illustrates a modified elevational view of FIG. 1 and including means for supporting the apparatus;

FIG. 4 illustrates a cross-sectional view of a modification of the apparatus of FIG. 2 showing relative movement of the components thereof;

FIG. 5 illustrates a partly elevational and partly cross-sectional view of an apparatus of the invention for coating external and internal surfaces of a tubular member;

Figure 13:
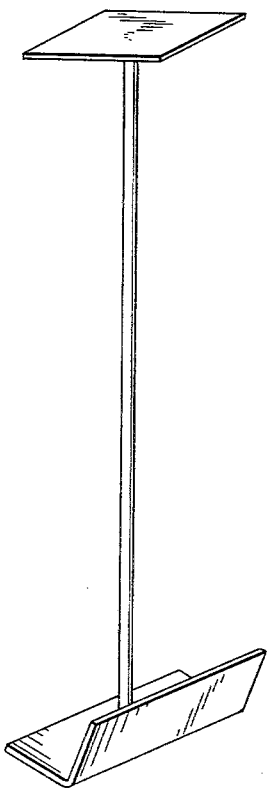
Figure 6:
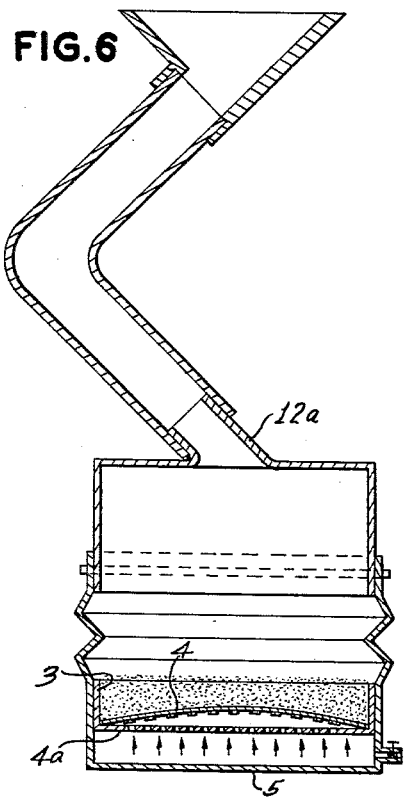
FIG. 6 represents a side elevation of an apparatus of the type shown in FIG. 1 as applied to the internal coating of a pipe bend.
Figure 7:
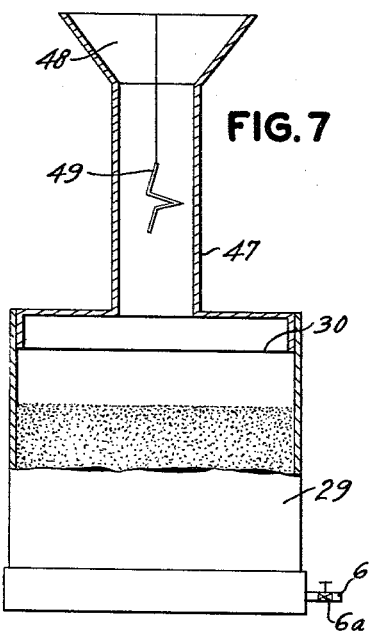
FIG. 7 illustrates in partly sectionalized side elevation how the apparatus in accordance with FIG. 2 can be adapted for the coating of articles of any desired shape.
Figures 9, 10:
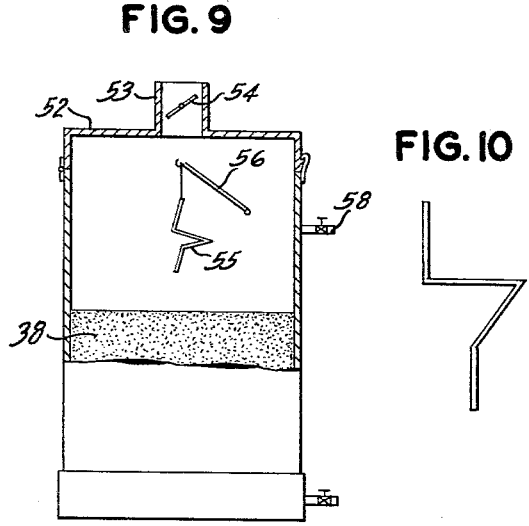
Figure 8:
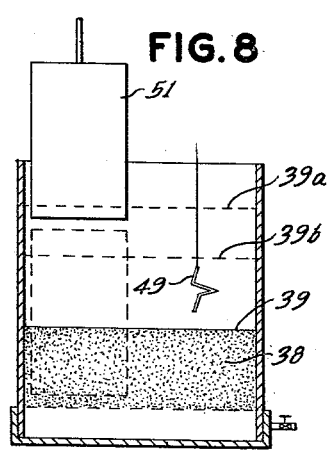
Figure 12:
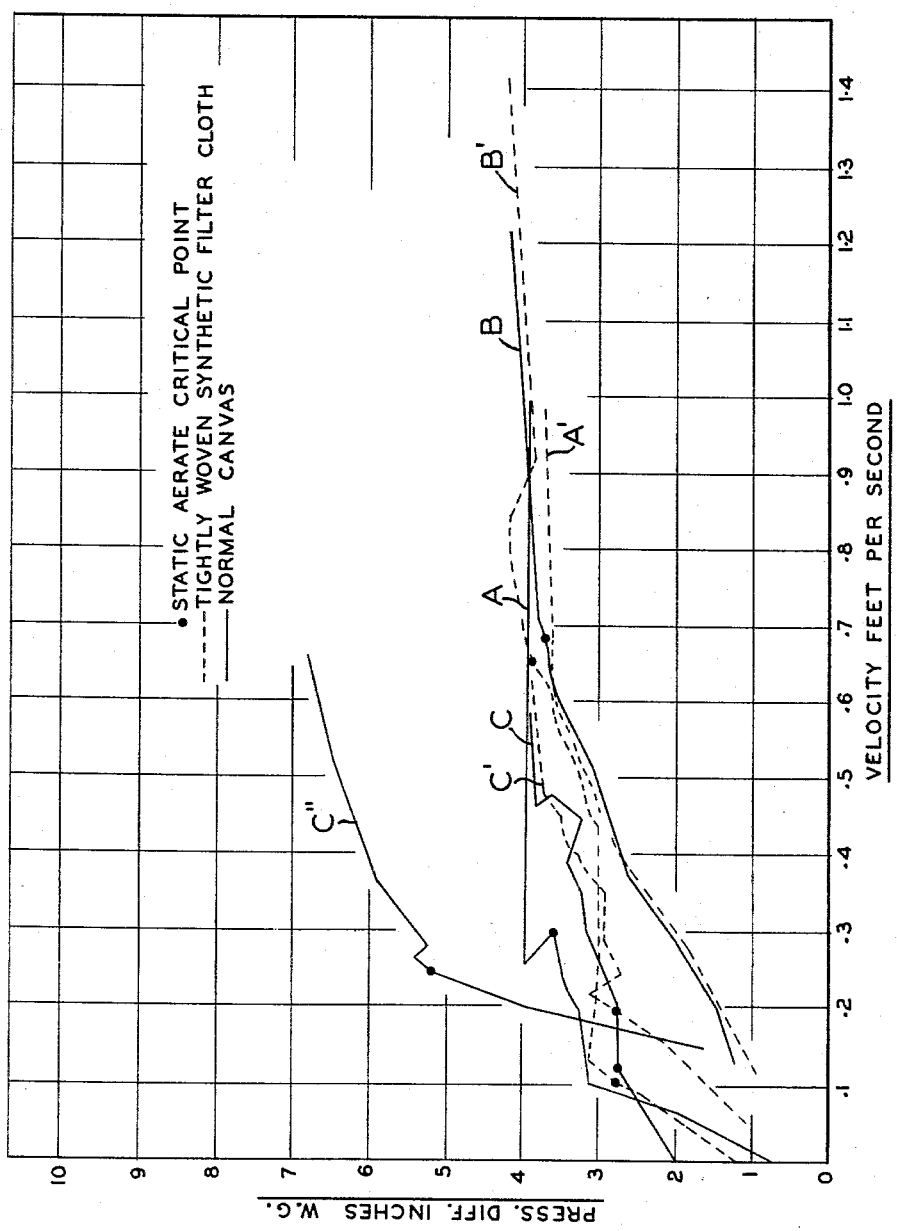

The operating principle of the embodiment illustrated in FIGS. 1, 2 and 3–7 is diagrammatically shown in FIG. 8;

FIG. 9 represents a diagrammatic vertical section through an alternative device for carrying out the process;

FIG. 10 represents a side elevation of a metal strip used in the experiment of Example 2;

FIG. 11 represents a typical graphical representation of the pressure drop across a bed of aerated material as a function of the velocity of the aerating medium;

FIG. 12 represents portions of similar curves to that shown in FIG. 11 obtained with different powders with two different kinds of bed support; and FIG. 13 represents a perspective view of the probe developed for carrying out the penetration test.

Figure 1:
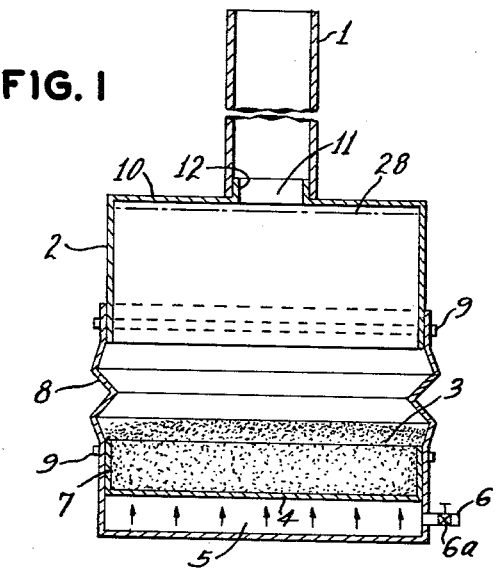
FIG. 1 illustrates a cross-section view of an apparatus for internally coating a tubular member with a plastic layer.

In accordance with FIGS. 1 and 3 of the drawings, a pipe 1, or the like, is internally lined by preheating it and connecting it to the upper portion of a tank 2 containing a bed 3 of thermoplastic particles or powder, such as powders of polyethylene, polypropylene, nylon, a vinyl, or a cellulosic material. The bed 3 may also be composed of plastic thermosetting powder material such as powders of epoxy resin, polyesters, phenolics, etc. The bed 3 may also be composed of metal powders of precious metals, lead, tin, etc., or powders or glass-like materials, e.g. glass which becomes plastic with the application of suitable temperatures. Also, the invention contemplates the use of powder mixtures composed of at least one powder which is capable of fusion with the application of heat, e.g., a plastic powder mixed with a ceramic powder. The bottom 4 of the container 2 in direct contact with the powder bed is a porous filter composed, for example, of woven or non-woven fabric, or a disc of compacted and sintered metal powder permeable to the passage of air or glass therethrough or a porous ceramic material and is encased by or otherwise communicates with an air or gas chamber 5 having an inlet means 6 and an inlet valve 6a for controlling gas pressure to the gas chamber 5.

In order to render the tank 2 capable of reducing and expanding its volume, the base 7 of the tank is vertically movable in relation to the upper portion of the tank by means of a flexible member 8, e.g. bellow-shaped, joining the base 7 with the tank upper portion by bands 9 and 9' and forming wall portions of the tank. The top of the tank is provided with a cover 10 having a substantially central aperture 11 formed therethrough with an annular seat 12 mounted on cover 10 around the aperture 11 and extending upwardly of the aperture.

FIG. 3 shows a modification of FIG. 1 in that the annular seat 12 is provided with an upper flange 13, the pipe 1 is provided with a terminal flange 14 and a pipe 15 having terminal flanges 16 and 17 is interposed between the annular seat 12 and pipe 1 by means of bolts 18 interconnecting the mating flanges. Heat insulating gaskets 19 and 20, e.g. asbestos gaskets, are positioned and secured between the flanges. A collar 21 having diametrically opposed ears or lugs 22 and 23 is mounted circumferentially of the pipe 15, and braces B and B' are secured to the lugs, whereby the braces are fixed to a pair of laterally spaced supports by means of clamps 26 and 27, or the like. The entire assembly illustrated by FIG. 3 is mounted between the supports 24 and 25.

Figure 2:
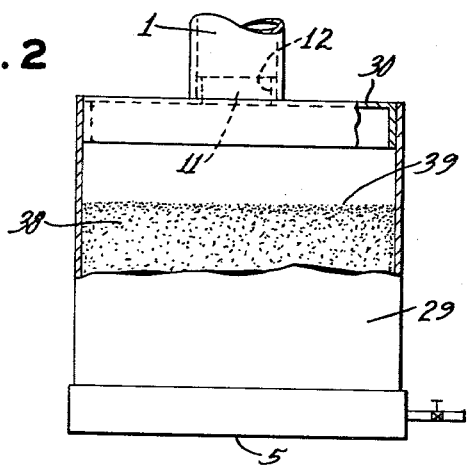
FIG. 2 illustrates a partly cross-sectional and partly elevational view of a modification of the apparatus of FIG. 1.

FIGS. 2 and 4 illustrate a modification of the invention, partly with respect to the method of varying the tank capacity and partly with respect to the method of heating the pipe to be internally coated.

Regarding FIG. 2, the tank in the form of a hollow cylinder 29 and the cover 10, as illustrated in FIGS. 1 and 3, is replaced by a piston member 30 vertically movable along the inner walls of the cylinder 29. All other identical structural components bear identical reference numerals to identical parts illustrated in FIGS. 1 and 3.

Figure 2A:
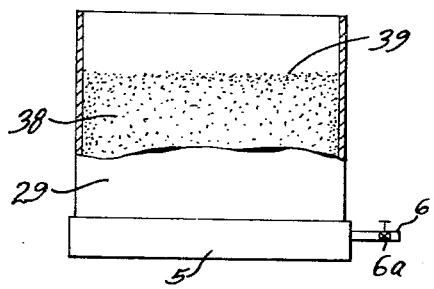
FIG. 2a illustrates a modification of FIG. 2 showing a portion thereof removed.

FIG. 2a illustrates a modification of FIG. 2 in that the piston member 30 and its associated operating components are removed leaving the top of the tank or cylinder 29 open.

In operation according to FIG. 2a, pressurized air or gas is introduced into the chamber 5 through inlet 6 and valve 6a at a pressure normally between 4 and 48 inches water gauge depending on the specific gravity of the plastic powder bed 3, the height of the bed and the pressure drop across the filter. With powder beds of higher specific gravity, higher pressures are employed. The pressurized air or gas passes through filter 4 and fluidizes the powder bed with the expanded fluidized mass attaining a surface level 39 with the powder bed preferably in an evenly fluidized state as hereinbefore described. Even fluidization may be enhanced by slow swirling of the bed. With the powder bed preferably in its optimum fluid condition, the valve 6a is closed or otherwise activated to reduce the pressure admitted into the gas chamber, and a heated article (not shown) is at least partly immersed in the fluidized bed. When the valve 6a is closed, no more fluidizing gas is admitted to the gas chamber and the fluidized bed is permitted to at least partially collapse around the immersed article. When the valve 6a is operated to reduce the pressure in the gas chamber 5, the bed will collapse more slowly around the heated article. The heated article may be immersed in the fluidized bed either when the bed is collapsing or before the bed is permitted to collapse. In the latter case, the immersion of the article prior to collapsing will tend to destroy the optimum aerated condition of the bed, but the subsequent collapsing step sufficiently restores the desirable fluid condition and the article becomes effectively coated with a fused plastic layer. This method of collapsing the bed assures a uniform plastic coating without the necessity for moving either the article within the bed or the bed itself, although, of course, the bed may be vibrated to increase the speed of collapse if desirable under certain conditions depending on the type of powder employed and the thickness of coating desired.

The optimum fluid condition previously referred to is a defined condition, when just sufficient air or gas passes, essentially vertically, through the system to separate particle from particle. This aeration has the effect of reducing particle to particle friction to a minimum, the powder thus becomes truly freely flowing and to such an extent that it has the flow properties of a liquid. Such materials have a certain bulk specific gravity as illustrated by the following examples:

EXAMPLE 1

*Bulk specific gravities of fluidized materials*

A certain polyethylene in moulded form has a specific gravity of _____ .940
The same plastic in compacted powder form has a specific gravity of _____ .375
The same plastic in sieved or uncompacted form has a specific gravity of _____ .350
The same plastic in powder poorly or unevenly fluidized has a specific gravity of _____ .275
The same plastic in powder with optimum and even fluidity has a specific gravity of _____ .25
The same plastic powder with boiling and uneven fluidity has a specific gravity of _____ .225

The following table illustrates practical fluidization data obtained with the same powder:

| Height of Powder in bed in inches | Inches water gauge in the airbox | Percentage Volume increase over unaerated bed | Remarks |
| --- | --- | --- | --- |
| 29.5 | 0 | 0 | Unaerated bed. |
| 37.5 | 17.5 | 27.1 | Weak uneven fluidity. |
| 40.0 | 19.75 | 35.6 | Optimum even fluidity. |
| 41.5 | 20.25 | 40.1 | Bed "boiling," uneven fluidity. |

It may be seen from the above that to increase the volume of the powder by only 4½%, from optimum a state of violent boiling was brought about, and it is particularly this boiling that results in an uneven porous coating. To increase the volume sufficiently to force the powder up through a pipe would destroy the properties of a bed, and there would be merely a surge of air and powder through the pipe.

EXAMPLE 2

*Relationship between state of aeration and coating*

An optimally fluidized bed as described in the previous example was prepared in the apparatus illustrated in FIG. 2a. A metal strip having the shape shown in FIG. 10 was heated and suspended in the fluidized bed in the position shown in FIG. 10. The conditions of the experiment were exactly the same as in normal dipping practice. The following observations were made:

Along the vertical parts of the metal strip there was a tendency for the air to form channels in approximately vertical paths, resulting in an uneven coating.

The inclined portion of the strip collected excess air on the underside which travelled upwards against the surface resulting in boiling and uneven coating. The upper surface of the inclined portion was partly screened off and accordingly the powder collapsed onto this surface, slid down to the bottom edge and was again picked up in the vertically rising air current. The resulting coating showed the effect of this downward sliding movement. The underside of the horizontal portion of the strip was also unsatisfactorily coated for the same reason as the underside of the inclined part. In contrast thereto, the upper surface of the horizontal portion was very satisfactorily coated. The powder again collapsed on top of this part and could not slide off. When the strip was removed from the bed, the excess powder was blown off.

A second experiment with a similar strip was then carried out under the following conditions:

Optimum fluidized conditions were again obtained in an apparatus as shown in FIG. 2a. Valve 6a was then closed and as soon as the bed started collapsing the hot strip was dipped into the tank and removed approximately 5 seconds later. By that time the fluidized bed had collapsed almost completely. As a result of the collapsing of the powder against the metal strip from all sides, a very even coating was obtained on all parts of the metal strip. There was very little difference in quality of the coating on the various portions of the strip.

EXAMPLE 3

*Coating of chemical apparatus*

The experiment was carried out with a heavy iron lid for a vessel for chemical purposes. The lid was quite irregularly shaped, and had difficultly accessible corners as well as pipe nipples and pipe stubs connected thereto. The lid was heated and dipped in a collapsing bed in the manner described in the previous example. The lid of 25 inches diameter emerged from the bed with a practically perfect plastic coating. Even the corners and the insides of the pipe connections were well and evenly coated.

EXAMPLE 4

Internal coating of pipes

In operation, according to FIG. 1, pressurized air or gas is introduced to the chamber 5 through inlet 6. The pressurized air passes through the filter 4 and fluidizes the powder bed 3, with the expanded fluidized mass maintaining a distinct fluid surface and the bed of particles being expanded vertically in the tank 2 with the expanded fluidized powder bed having a surface level as at 28. Thereafter, the base 7 of the tank 2 is rapidly raised vertically and reduces the effective volume of the tank 2 causing the surface level of the fluidized powder bed to rise upwardly within the pipe 1 to be coated. Essentially, the tank diameter is greater than the pipe diameter and a small vertical movement of the base 7 causes a proportionally greater vertical rise of the fluid level within the pipe 1, whereby substantially long pipes can be filled with an aerated powder mass. Prior to raising the fluidized bed level 28 into pipe 1, the pipe is heated.

In general, even a short contact period with the heated pipe is sufficient to provide an adequate plastic layer to the inner surface of the pipe. Consequently, it is normally sufficient to raise the base 7 of the tank 2 for a short time, permit the bed to collapse as hereinafter more particularly described in connection with FIGS. 2 and 4, and then lower the base 7, whereby the aerated particles which do not become fused are returned to the tank 2. However, under certain conditions, raising and lowering of the bed may be repeated, or the aerated particles may be maintained inside the pipe for longer periods.

Regarding FIG. 4, the pipe 1 is provided with a resistance heating coil 31 in thermal contact with the pipe 1 and energized by a source of electrical energy 32. An inverted hollow cone-shaped member 33 is secured to the top of pipe 1, for example, by means of flanges 34 and 35. The larger opening 36 of the inverted cone is covered with a filter 37.

In operation, according to FIGS. 2 and 4, the coil 31 is energized to heat the pipe 1. Thereafter, the piston member 30, supporting the pipe 1 is rapidly lowered into the fluidized powder mass 38, whereupon the capacity of tank 29 is reduced with the fluid surface level 39 of tank 29 rising into the pipe 1 to reach its new surface level 40, as illustrated by FIG. 4. Otherwise, the coating procedure is identical to that described with respect to FIGS. 1 and 3.

Regarding FIG. 5, the apparatus of the invention is modified to provide either for the external coating of an elongated article, or for both the external and internal coating of the article should it be in the form of a tube.

For example, when it is required to coat both external and internal surfaces of a pipe, one surface with one type of plastic layer and the other surface with a different type plastic layer, the apparatus comprises a first and second tank 41 and 42, with the first tank 41 and its associated operative components being substantially identical to that illustrated by FIG. 3. The second tank 42 is provided with an aperture 43 through the air chamber 5 and with the tubular or pipe section 15, as illustrated by FIG. 3, substantially hermetically sealed through the aperture 43 by known sealing methods and which pipe 15 also passes through the filter 4. The second tank 41 and its associated assembly is similar to the construction of FIG. 1, except that the pipe 44 and pipe 1 are concentrically spaced from each other. It will be apparent from FIG. 5 that the tanks 41 and 42 are independently operable for the raising and lowering of their respective fluidized powder beds along the lines hereinbefore described when operating as single units. However, the interiors of the pipes 1 and 44 may be operated from a single tank with a suitable by-pass system for simultaneously filling pipes 1 and 44 with the fluidized bed of particles when the coatings on both inner and outer surfaces are of identical composition. It is apparent that the tank 41 may be dispensed with when the article is an elongated solid for externally coating such solid article as long as the article is supported within the pipe 44.

The successful operation of the principle for coating pipes according to the invention is basically dependent on the ability of the apparatus to cause the powdered coating material to very rapidly and evenly contact the whole of the surface area to be coated. During this period, which is only a fraction of a second for the most efficient operation, and one in which the powder is travelling parallel to the surface to be coated, no appreciable coating film has built up on the preheated work piece. In this short period, however, particles of powder adhere by fusion, fairly close together, over the preheated surface. This is the first stage. The second stage is for the raised bed to gradually lose its aeration, because the increase of head produces a pressure great enough to prevent enough air from entering the system, and to cause powder particles to press against the preheated surface and the particles already laid down in an even and homogeneously dispersed manner. This second stage takes a few seconds depending on the loss of fluidity through the granular nature of the powder. At the end of this period the bed can no longer be referred to as a fluid bed in a state of equilibrium. It is, rather, a mass of powder evenly settling or collapsing but not compacted. At the end of this second stage the powder may be returned to the bed container by increasing the volume of the bed container, which in effect causes a drop in pressure which sucks the powder back into the container. This suction is an additional aid to a gravitational return and assists in removing the unfused powder from the work piece. However, in certain cases where horizontal surfaces or surfaces inclined at less than 60 degrees to the horizontal tend to hold an excess of unfused powder, this excess may be removed by a controlled and built-in air current.

At the end of this stage a perfect coating is being formed and the pipe or article may be removed from the apparatus and allowed to cool until the film is finally and completely formed. Should a thicker coating be required, the powder is refluidized in the bed and the process repeated with the pipe still in position.

At the end of the second stage previously referred to, it is possible in certain circumstances, for example, when the powder particles have reasonably regular surfaces or the powder may be described as having free flowing proportions, to allow the powder to remain in the coating position. More powder will fuse and obtain, in the case of polyethylene of low density, a specific gravity of approximately 0.92 while the adjacent powder has a bulk specific gravity of possibly 0.35, depending on its particle structure and this would tend to leave a space between film and powder. However, the condition is that the powder has sufficient free flowing qualities to keep this space closed. When using a powder of rounded particles between 100 and 300 mesh (British Standards) it was possible to extend the coating period up to half a minute and very heavy coatings were obtained, i.e. 0.040 inch to 0.100 inch. A coating of 0.030 inch is considered a heavy coating with this process. The pipes in these examples were heated to 450° F. In all of the experiments the contraction of the fluidizing bed took place in less than 0.5 second. The sudden contraction in container volume by about two cubic feet in the case of the apparatus shown in FIG. 2 caused a sudden pressure increase in the bed from approximately 10 inches water gauge originally to approximately 52 inches water gauge. As soon as the pipe we filled with the aerated bed, the air pressure valve was closed and the bed was permitted to collapse. In normal operation the volume of the fluidizing chamber was expanded back to normal after approximately 6 seconds whereafter the pipe was removed and allowed to cool. The coating thickness was then on an average 0.016 inch thick. It should be borne in mind that in this normal type of operation the powder is still considerably aerated after the said coating period of for example 6 seconds. Air is still bleeding in an upward direction, thus giving some degree of fluidity and free flow characteristics to the powder and thus the powder maintains good and even contact with the entire surface of the pipe. With this gentle "bleeding" there is no channeling and, of course, no parallel movement of air and powder or surging or turbulence.

EXAMPLE 5

*Coating of a pipe bend*

Referring now to FIG. 6, the apparatus employed in this operation was identical with that shown in FIG. 1 with the exception that the annular seat 12a was inclined at an angle of 45 degrees. A rectangular pipe bend, inner diameter 4 inches, heated to 450° F. was placed on the annular seat 12a. Polyethylene powder was fluidized in the fluidizing space 3 in the manner described in the previous example. A partition 4a with non-return valves was provided between the air chamber 5 and the support 4 immediately above the partition 4a. The bed was then compressed in the manner described in the previous example in the course of between 0.3 and 0.5 second. The powder was displaced into the pipe bend and retained there for 5 seconds. During this period the non-return valves in partition 4a prevented a return of fluidizing medium from the bed into the air chamber. After 5 seconds the fluidizing space was expanded again whereby the material in the pipe section was drawn back into the fluidizing chamber. The pipe bend was removed and had a perfect inner coating of between 0.01 and 0.016 inch thickness.

EXAMPLE 6

*Coating of objects of various shapes by the displaced bed method*

Referring now to FIG. 7, the apparatus is identical in principle with that shown in FIG. 2 and only the features of difference have been indicated by new numbers. In this embodiment the place of the annular seat 12 and the hot pipe 1 is taken by a coating chamber 47 of smaller internal diameter than the fluidizing chamber, permanently or semi-permanently connected to the top of the piston 30. An experiment was carried out using the same metal strip as in Example 2:

The fluidizing chamber 29 was filled with enough polyethylene powder to occupy a volume when fully fluidized equivalent to a powder level up to the conical portion 48 of the coating chamber when the piston 30 is rammed into the fluidizing chamber. Air was blown through gas inlet 6 at a rate sufficient to produce a perfect fluidized bed. The strip metal 49 was heated to 450° F. and suspended in coating chamber 47. Piston 30 was then rammed down as in the previous example, retained in the lowered position for 5 seconds during which period the collapsing powder bed was in constant contact with strip 49 and then retracted to cause the powder to surge back into the coating chamber. Strip 49 was removed from the fluidizing chamber and allowed to cool. A perfect and smooth coating was obtained having an average thickness of 0.012 inch.

The operating principle of this type of operation is illustrated diagrammatically in FIG. 8. In FIG. 8, a fluidizing vessel is shown of the type illustrated in FIG. 2a. The walls of the vessel extend a suitable height above the normal level 39 of the fluidized powder bed 38. During the fluidization stage a heated object is suspended just above the level 39 of the normally fluidized bed. Perfect or almost perfect fluidized conditions are preferably maintained while the plunger 51 is kept in the raised position. The plunger 51 is then rammed down into the powder bed (broken line) displacing a considerable volume of the fluidized powder and resulting in a new powder level 39a. As a result of the increased gravitational head on the bottom of the bed, the gas pressure is insufficient to maintain fluidized conditions and the powder bed starts collapsing. The collapsing powder is gently pressed from all sides against the object to be coated and enters all corners and hollow spaces of this object. The collapsing of the bed is accompanied by a dropping of the level of the powder bed from the maximum level 39a to a lower level 39b. In normal operation the plunger is withdrawn from the bed before the powder has become de-aerated completely. The powder then drops back into the space previously occupied by the plunger and becomes fluidized once more.

EXAMPLE 7

*Alternative coating method*

Referring now to FIG. 9, an apparatus is shown which is identical with the type illustrated in FIG. 2a except that the top of the container is closed with a lid 52 provided with a gas outlet opening 53 and a shutter 54. The object 55 to be coated is suspended from a lever device 56 or equivalent allowing the object to be raised or lowered.

When the bed 38 is well fluidized, the shutter 54 is closed or partly closed, a back pressure resulting on the top of the bed. The article to be coated is now lowered into the bed which has meanwhile started to collapse and kept in the bed for the period required for the thickness of coating desired. The rate of collapsing of the bed can be carefully controlled by closing the shutter 54 to a greater or lesser extent.

In case it is desired to cause a more rapid collapse of the bed, gas under suitable pressure is blown into the gas space above the bed through pipe nipple 58 while shutter 54 is closed.

EXAMPLE 8

Beds of nylon, polyethylene, poly-vinyl-chloride or fluorinated polyethylene powders were used in this series of experiments. The powders had particle sizes, largely in the range 100–300 mesh, British Standards, the particles being regularly shaped and to a large extent devoid of projections.

The bed support was a tightly woven synthetic filter cloth in an apparatus as shown in FIG. 2a.

Air was slowly passed through the powder beds, whilst stirring from the bottom of the beds upwards was continuously applied. Static aerates as defined above were obtained over considerable ranges of air velocities. By increasing the velocity of the aerating medium truly fluidized conditions were finally attained.

When heated test strips of the type described in Example 2 were immersed in the static aerates, perfect coatings were produced on all test surfaces. The quality of the coatings was perfectly uniform and contrasted sharply with the results obtained by dipping the same strips in truly fluidized powders (see again Example 2).

EXAMPLE 9

A similar bed support was used as in the previous example. A bed, approximately 19 inches deep, of a high density of polyethylene was used, particle size 100–400 mesh, grain shape approximately spherical. Air was used as the aerating medium.

In this experiment, the overall air velocity was measured and the powder pressure head, which was numerically equal to the pressure drop through the bed. The results were plotted in FIG. 11. As the velocity of the air through the bed was increased from zero upwards, the pressure drop rose smoothly from point O to P. At point P the pressure drop was sufficient to balance the weight of the bed. From there onwards, the curve showed a somewhat irregular trend, having approximately the shape of a shallow sinus curve with a maximum near Q and a minimum at R. From there onwards, the curve became more regular and rose at a shallow angle up to S. On the ascending arm of the curve, the portion *b* represents the transition to a truly fluidized condition. The portion *a* corresponds to normal fluidized conditions under which conventional dip coating processes are carried out. Beyond S the bed "boils" vigorously.

If the gas flow is now decreased, the return curve does not follow the same path. Initially the return curve is higher than the ascending curve which is crossed at T. There is a transition portion indicated by c, over which the curve is slightly irregular, the irregularities being, however, largely repeatable. Channeling which may occur in this part may be overcome by slight stirring.

Below U the condition prevails which I refer to as the static aerate condition.

The approximate range of conditions best suited for dip coating in accordance with the invention is represented by d. In this range the powder bed has little tendency to channel and has a "viscosity" suitable for difficult coating operations.

A good measure of the "viscosity" of the bed is afforded by a penetration test for which I use the probe illustrated in FIG. 13. This probe comprises a stem 201 which is longer than the maximum depth of the bed and a baffle 202 at the lower end thereof having an angular cross-section, the apex being directed downwards. The preferred angle of the baffle is approximately 90° and each half of the apex has an area of approximately 2" x 3". In addition, a platform 203 is provided at the top end of the stem on which weights may be deposited. Other suitable arrangements for this purpose are of course possible.

In the present example, a total load of 1¼ lbs. of the probe was just adequate to cause the probe to penetrate to the bottom of the bed when released from the level of the top surface of the bed, while the bed was in the condition represented by point U of the curve. As the gas velocity was lowered, the load required by the probe to penetrate to the bottom of the bed increased steadily, until at point O the total load required amounted to 4½ lbs.

The test may also be carried out by using a constant load and measuring the depth of penetration in each case to arrive at a comparative set of readings.

An important phenomenon observed with static aerates is, the absence of any or any substantial volume changes of the powder bed with changes in the gas velocity. Thus, between points U and O on the return curve the volume of the bed is constant or substantially so. At O the bed is in a very labile condition and any mechanical disturbance will cause the bed to collapse completely and the powder to settle to the normal compactness of the loose powder.

The angle of repose increases as the gas flow is decreased.

EXAMPLE 10

The experiment of Example 9 was repeated with different powders using two different kinds of bed support. Only the return curves were plotted in FIG. 12.

(I) *Normal canvas as bed support*

CURVE A

Powder used: Low density polyethylene, irregularly shaped particles, strong tendency to agglomerate. Particle size of bulk of material (¾) 60–300 mesh British Standards.

To obtain a satisfactory fluidized bed it was necessary to shuffle and stir so as to limit channeling. Fully fluid conditions prevailed from 1 to ½ ft./sec. air velocity.

When the gas velocity was reduced, shuffling had to be continued until static aerate was attained at 0.3 ft./sec. Bed was then completely static from top to bottom. Channels formed occasionally during dipping operations but could be eliminated by stirring through the channel.

Penetration of static aerate: Excellent
Working range (i.e. suitable for dipping): 0.3–0.1 ft./sec.

Coating characteristics: Good for coating wire work, bad for pipe bends.

CURVE B

Powder used: +100 mesh fraction of above material.
A good fluidized bed was obtained without agitation of any sort between 1.1 and 0.9 ft./sec. gas flow.
The static aerate could be attained without stirring (0.65 ft./sec).
Working range: 0.65–0.5 ft./sec., lower down to "viscous";
Penetration of static aerate: Poor;
Coating characteristics: Usefulness limited by bad penetration.

CURVE C

Powder used: High density polyethylene of fairly spherical particle shape, 100–400 mesh British Standards.
An excellently fluidized bed was obtained with a little shuffling or rocking of the bed at 0.58–0.4 ft./sec. At 0.4 ft./sec. odd channels were observed if the rocking or shuffling stopped.
Static aerate conditions were attained by reducing the gas flow while simultaneously counteracting channeling at 0.13 ft./sec.

Penetration of static aerate: Good
Working range: 0.13–0.05 ft./sec.
Coating characteristics: Excellent for pipe bends.

(II) *Tightly woven synthetic filter cloth*

The filter cloth used as the bed support in the next range of experiments is marketed in South Africa by the South African Canvas Co. (Pty) Ltd., Johannesburg, under the trade designation TF 400. It has the following characteristics:

Permeability for air: 2.5 f.p.m. (at ½ inch water gauge)
Permeability for water: 190 gal./sq. foot per hour (at 40 in. water gauge)
Solids retention 87% (by a comparative test)
Breaking strength of strip 2" x 7" between jaws:
    Warp load: 1005 lbs.
    Weft load: 981 lbs.

CURVE A'

Powder used: Same as Curve A.
With moderate shuffling a very good fluidized bed was attained between 0.95 and 0.47 ft./sec. gas flow. With rocking and shuffling the bed was excellent.
Partial deaeration (i.e. reduction of gas velocity) took place with shuffling only and the static aerate was formed at 0.1 ft./sec.

Penetration of static aerate: Comparable with A.
Working range: 0.1–0.05 ft./sec.
Coating characteristics: Excellent for wire work, bad for pipe bends because of poor flow qualities.

CURVE B'

Powder used: Same as Curve B.
Very good fluidization was attained without any form of agitation between 1.46 and 1.0 ft./sec.
The static aerate formed at 0.65 ft./sec.

Penetration: Too poor for satisfactory dip coating.

CURVE C'

Powder used: Same as Curve C.
A good fluidized bed was attained without shuffling between 0.6 and 0.5 ft./sec.
The static aerate formed at 0.21 ft./sec.

Penetration of static aerate: Good
Working range: 0.21–0.1 ft./sec.
Coating characteristics: Excellent for pipe bends.

CURVE C"

Repeat experiment of that given in Example 9, powder same as for Curves C and C'.

The results show conclusively the superiority of fine spherical particles and of the filter cloth TF 400 which, it was found, produced an extremely fine dispersion of the gas.

The term "shuffling" denotes agitation of the material by means of a reciprocating screen or system of slats at the bottom of the bed.

EXAMPLE 11

*Correlation between dipping time and coat thickness*

The following experiment was carried out using mild steel plates ⅜ inch thick. These were heated and dipped in a static aerate of white polyethylene powder with the following results:

| Temperature of oven for heating the article | Time of heating of object, mins. | Dipping time, secs. | Coat thickness, 1/1000 inch |
| --- | --- | --- | --- |
| 315° C | 20 | 8 | 25 |
| 315° C | 20 | 5 | 20 |
| 315° C | 15 | 3 | 10 |

EXAMPLE 12

A fluidized bed was prepared with polyethylene powder in a fluidizing vessel having a cross-sectional area of approximately 6 sq. feet. A steel plate 1 foot square was vertically immersed in the bed. The quality of the fluidized bed was not greatly affected apart from channeling occurring along the surface of the plate.

Subsequently the steel plate was immersed horizontally. Immediately the powder bed above the plate collapsed on top of the plate.

The air flow through the bed was then reduced until the static aerate was attained. Horizontal immersion of the plate in the statis aerate to a depth of 6 inches or more did not produce any noticeable change in the condition of the bed above the plate.

EXAMPLE 13

The procedure described in Example 4 was repeated and further investigated. It was found that the powder had assumed the static aerate condition by the time it reached the top of the pipe. Even when the displaced material was maintained in the pipe for several seconds, the mobility of the powder at the end of that period indicated that the material was still aerated to a considerable extent and by no means fully settled.

In this procedure it was found advantageous to slowly "meter" the aerate powder through the pipe back into the fluidizing chamber with a metering device such as a star wheel, a revolving door-like mechanism or a screw conveyor or the like during the actual coating stage.

The same effect is attained when filling the whole pipe including the funnel with aerated material during the compression step and then slowly increasing the volume of the fluidizing vessel during the coating stage whereafter the vessel is rapidly expanded to return all powder to the fluidizing chamber.

In the case of the coating of pipes and the like, the slow wiping movement of the aerate along the pipe surface—whether resulting from the collapsing of the bed or from the said metering—had a definite beneficial result on the quality of the coating.

The initial static aerate in the bed has the effect of causing the filling up of all irregularities and crevices in the original surface. Subsequently it is of less importance if the powder bed loses much of its aeration, particularly not as long as the powder is kept moving. Some gas keeps filtering through the powder throughout the process so that the powder retains some degree of aeration throughout.

What is claimed:

1. A coating process which comprises contacting the surface of an article conditioned to retain a coating of particles from a bed of particulate material aerated by the flow of gas therethrough, said bed of material throughout its depth being in a state of uniform and continuous aeration less than that of a fluidized bed of said material and more than that of a loosely settled unaerated bed of said material by the movement of a gas upwardly through said bed at a flow rate to establish a static aerate condition, immersing the article to be coated in said bed while continuing the flow of said gas at a rate to maintain the aerated bed of coating material in a static aerate condition during the coating period and removing the coated article from said bed.

2. A coating process as claimed in claim 1 in which the particulate material is a powder, the bulk of which has a particle size between 50 and 400 mesh British Standards.

3. A coating process as claimed in claim 1 in which the particulate coating material is a thermoplastic material.

4. A coating process as claimed in claim 1 in which said static aerate condition is produced by initially completely fluidizing the bed of particulate material and subsequently reducing the aeration of said bed to said static aerate condition.

5. A coating process as claimed in claim 1 in which the said state of aeration is obtained by flowing said gas through the bed of material while agitating it carefully to obtain said state of aeration, the flow rate of said gas being lower than required to obtain said state of aeration without agitation.

6. A coating process according to claim 1 which comprises contacting the article to be coated several times in succession with separate beds of particulate plastic coating material in said state of aeration.

7. A coating process as claimed in claim 6 in which one bed is formed of a particulate material having a composition different from that of another bed.

8. A coating process as claimed in claim 1 in which said bed is agitated during the coating operation.

9. A coating process as claimed in claim 1, in which said article is heated to cause said coating material to adhere to it and said coating material is a thermoplastic material.

10. A coating process, as claimed in claim 1, in which said bed is agitated during the initial aeration thereof to facilitate the attainment of said final state of uniform aeration.

References Cited by the Examiner

UNITED STATES PATENTS 2,987,413   6/61   Dettling et al. _____ 117—21
3,093,510   6/63   Olson et al. _____ 117—21 X
3,140,195   7/64   Nagel _____ 117—21

OTHER REFERENCES

Plastverabeiter: September 1956, pp. 342–348.
Product Engineering, vol. 28, No. 1, January 1957, pp. 140 to 143.

WILLIAM D. MARTIN, *Primary Examiner.*